United States Patent [19]

Geneste et al.

[11] Patent Number: 4,656,643
[45] Date of Patent: Apr. 7, 1987

[54] LINE INTERFACE CIRCUIT

[75] Inventors: Michel Geneste, Vence; Christian Jacquart, Gattiere, both of France

[73] Assignee: International Business Machines Corp., Armonk, N.Y.

[21] Appl. No.: 764,460

[22] Filed: Aug. 12, 1985

[30] Foreign Application Priority Data

Aug. 24, 1984 [EP] European Pat. Off. ........ 84430030.1

[51] Int. Cl.⁴ .............................................. H04L 1/24
[52] U.S. Cl. ........................................ 375/10; 371/15; 375/7
[58] Field of Search ................... 375/7, 8, 10; 371/15, 371/22, 24, 25; 370/13, 15, 24, 31; 455/67, 73, 79; 330/2, 252; 178/2 C, 63 R, 69 R, 69 A; 340/825.05, 825.16

[56] References Cited

U.S. PATENT DOCUMENTS

| | | |
|---|---|---|
| 3,655,915 | 4/1972 | Liberman et al. .................... 370/15 |
| 4,271,513 | 6/1981 | Maejima et al. ..................... 370/15 |
| 4,529,979 | 6/1985 | Kusama et al. ................ 340/825.05 |
| 4,538,026 | 8/1985 | Yasue .................................. 178/2 C |

*Primary Examiner*—Benedict V. Safourek
*Attorney, Agent, or Firm*—John B. Frisone

[57] ABSTRACT

A line interface circuit for connecting the transmit and receive ports of a transmitter to transmit lines (LX) and receive lines (LR), respectively. The interface circuit includes a transistorized differential amplifier provided with two load circuits comprising resistors and diodes connected in series, and logic control means for selectively switching power to either load circuit. One of the load circuits drives the transmit line (LX) while the other drives the receive ports of the transmitter. Switching the load circuits makes it possible to use the interface circuit either to drive the transmit line (LX) or to loop the output signal from the transmitter back to the receive input thereof, while loading the transmit line (LX) with its characteristic impedance.

4 Claims, 1 Drawing Figure

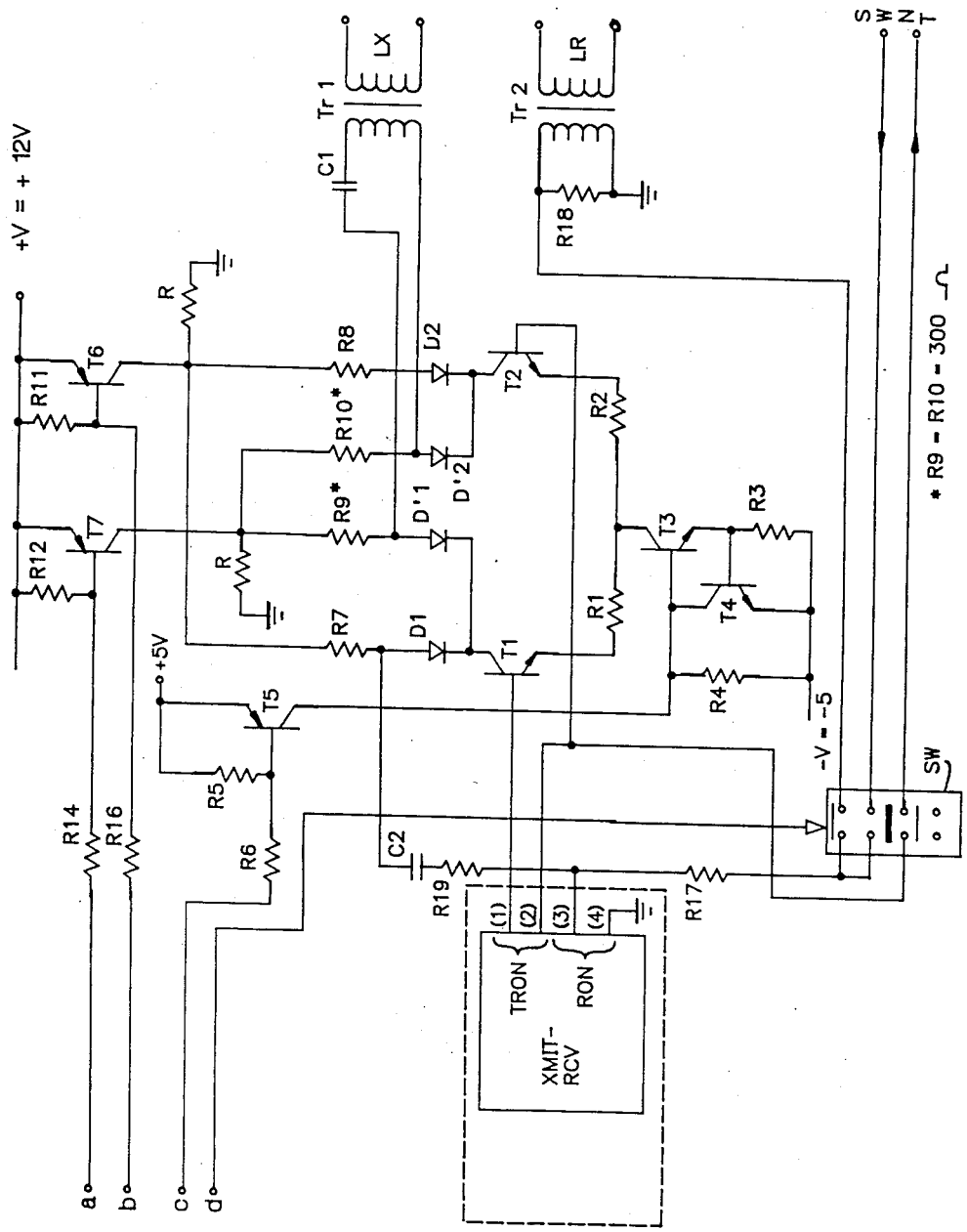

LINE INTERFACE CIRCUIT

Technical Field

This invention relates to a line interface circuit for a transmission system using transmission lines. The invention finds particular application in transmission devices provided with test means requiring that the output from a transmitter be fed back to the input of a receiver located in the same place as the transmitter.

BACKGROUND ART

Today's transmission networks, especially digital ones, are growing increasingly complex. Any interruption, however brief, of the transmission process can prove extremely costly. It is, therefore, highly desirable that test means be provided to determine as quickly and thoroughly as possible the manner in which individual transmitting and receiving stations in such a network are functioning.

To this end, transmission networks usually include a central device which remotely controls test operations. A well-known test, called loopback or wrap test, consists in looping a test signal from the central control device through the station to be tested and back to the central device for measurement in order to determine alterations due to the transmission process and, consequently, the existence of faults in that part of the network. To exchange the effectiveness of this test, the test signal, prior to being sent back to the central control device, should preferably travel through the greatest possible part of the station being tested; that is, the test signal should reach a point as close as possible to the transmission line that is to be driven, through an analog circuit called interface circuit, by the transmitter in said station. Thus, the interface circuit should be designed to allow the test signal to pass therethrough without driving the attached transmission line in the process. A simple solution would be to use electromechanical relays to isolate the interface circuit from the transmission line while the test signal is being fed back to the central control device. Unfortunately, electromechanical devices are both unreliable and expensive.

SUMMARY OF THE INVENTION

It is, therefore, the object of the present invention to provide a transmission line interface circuit incorporating fully electronic mean for performing loopback tests.

Also, the interface circuit is designed to appropriately load the transmission line when the line is isolated during loopback test operations.

The foregoing and other objects, features and advantages of the invention will be apparent from the following more particular description of a preferred embodiment of the invention, as illustrated in the accompanying drawing.

BRIEF DESCRIPTION OF THE FIGURE

The FIGURE illustrates an embodiment of the interface of the invention.

DETAILED DESCRIPTION OF THE INVENTION

The illustrated embodiment of the interface circuit is disposed between the input and the output of a transmit-receive (XMIT-RCV) station forming part of a transmission network (not shown) and transmit and receive lines, respectively designated LX and LR, connected to said station. Output ports 1 and 2 in the transmit portion (TRON) of the station are connected to the inputs of a differential amplifier. More precisely, the output ports are connected to the bases of two NPN transistors T1 and T2 whose emitters are connected to a current source through resistors R1 and R2. The current source comprises two transistors T3, T4 and two resistors R3, R4. Resistor R4 is additionally connected across a DC voltage source ($\pm 5$ V), with the connection to the +5 V terminal being made through a PNP switching transistor T5. The base of T5 is connected through a resistor R6 to a control terminal c to be described later. The collector of each of transistors T1 and T2 is loaded by means of a couple of circuits comprising a diode and a resistor connected in series. More precisely, the collector of T1 is connected to the cathodes of two diodes D1 and D'1, while the collector of T2 is connected to the cathodes of two diodes D2 and D'2. The anodes of diodes D1, D2, D'1 and D'2 are respectively connected to resistors labeled R7, R8, R9 and R10. The opposite ends of resistors R7 and R8 are connected to the collector of a PNP switching transistor T6 the emitter of which is connected to the positive terminal of a power supply (providing +12 volts, for example). Similarly, the free ends of resistors R9 and R10 are connected to the collector of a PNP transistor T7, the emitter of which is also connected to the positive terminal of the 12 V supply. Resistors R11 and R12 connect the collectors of transistors T6 and T7 to the positive terminal of the +12 V supply, respectively. The bases of transistors T7 and T6 are respectively connected through resistors R14 and R16 to control terminals a and b to be described later.

The anodes of diodes D'1 and D'2 are connected to transmit line LX through a transformer Tr1. A capacitor C1 in the primary of transformer Tr1 blocks the DC component of the input signal to said primary.

Input port 3 in the receive portion (RON) of the transmit-receive station is connected to receive line LR through a resistor R17, a switch SW (to be described later), and a transformer Tr2. The second input port, 4, is connected to ground, as is one of the terminals of the secondary of Tr2. A resistor R18 is parallel-connected to the secondary of Tr2.

The anode of diode D1 is connected to input port 3 through a RC network comprising a capacitor C2 and a resistor R19 connected in series.

A two-wire line SWNT, used to transmit and receive signals, is also provided. The transmit wire is connected to output port 2 of the transmit-receive station through switch SW. The receive wire is connected to input port 3 of said station through switch SW and resistor R17.

A control terminal d serves to control switch SW.

Resistors R are provided to connect the collectors of transistors T6 and T7 to ground.

During Transmit/Receive operation, where four wires, that is, lines LX and LR, are used to transmit and receive signals, terminals a, b and c are at the 0, 1 and 0 logical levels, respectively. This being so, the base of transistor T6 goes to a positive voltage level and this transistor is turned off. Transistors T5 and T7 are turned on. Since T5 is on, the current generator (T3-T4) is turned on. Since T7 is also on, the differential amplifier is powered through load circuits R9-D'1 and R10-D'2. Every signal appearing at output ports 1 and 2 of the transmitter-receiver will drive the differential amplifier (T1-T2), which will in turn drive transformer Tr1, hence transmit line LX.

Because T6 is turned off, no signal will be applied to the transmitter-receiver through circuit C2-R19. However, switch SW is controlled by a logical signal applied to terminal d to cause the signal from line LR to reach input ports 3 and 4 of the transmitter-receiver.

In the test mode of operation, terminals a, b and c are at the 1,0 and 0 logical levels, respectively. Thus, transistors T5 and T6 are turned on while T7 is turned off. Because T7 is off, load circuits R9-D'1 and R10-D'2 are disabled, so that transmit line LX is no longer driven. However, PTT regulations in some countries, such as France, require that, in this case, line LX be physically connected to a load equivalent to its characteristic impedance Zc, with Zc=600 ohms, for instance, for the purpose of the loopback test. This is the reason why a value of 300 ohms was selected for R9 and R10. With T6 on and T7 off, diodes D'1 and D'2 are reverse biased and, therefore, turned off. This being so, the output signal appearing at ports 1 and 2 is amplified by differential amplifier T1-T2. The amplified signal is taken from load circuit D1-R7 by RC network C2-R19 and sent back to input port 3 of the transmitter-receiver. Thus, the signal from the transmit portion of the station with which the interface circuit just described is associated, is looped back to the receive portion of the same station. During these operations, switch SW is controlled so as to prevent the amplified signal from being sent to transformer Tr2. In other words, by providing the differential amplifier with a judiciously constituted load circuit and with an extremely simple digital control circuit, a loop is established for the purpose of the loopback test. Also, this makes it possible to test the interface circuit itself, in addition to the transmit-receive station, as will be appreciated from the foregoing description.

If it is desired to use two-wire line SWNT, control terminal c is caused to rise to the 1 level, thereby turning transistor T5 off. As a result, current generator T3-T4 is also turned off.

Amplifier T1-T2 is disabled. The transmit line, as explained earlier, is terminated in its characteristic impedance Zc=R9+R10=600 ohms. Also, switch SW is controlled by a logic signal applied to terminal d to connect output port (TRON) 2 of the transmit-receive station to the transmit wire of line SWNT, while the receive wire is connected to input port 3 of said station. The connections through SW are established by means of simple conductive straps.

While the invention has been particularly shown and described with reference to a preferred embodiment thereof, it will be understood by those skilled in the art that numerous changes in form and detail may be made therein without departing from the spirit and scope of the invention.

What is claimed is:

1. A line interface circuit for selectively, in one state, interconnecting the transmit and receive ports of a transmit receive device to transmit and receive lines, respectively, and in another state to each other through an active portion of the said line interface circuit, said line interface circuit comprising:
   a power supply;
   a differential amplifier having a first and second input and first and second outputs;
   first means connecting the first and second differential amplifier inputs to the transmit ports of the transmit-receiver device;
   a first load circuit connected to the first and second differential amplifier outputs and to the transmit line;
   first switching means connecting said first load circuit to the power supply and arranged such that power is supplied to said differential amplifier when the first switch means is turned on by a control signal;
   a second load circuit connected to said first and second differential amplifier outputs and to the receive ports of the transmit receive device;
   second switching means connecting said second load circuit to the power supply and arranged such that power is supplied to said differential amplifier when the second switch means is turned on by a control signal;
   third switching means connecting the receive ports of transmit receiver device to the receive line under control of a third control signal;
   logic control means for selectively supplying control signals to said first and second switching means whereby said differential amplifier is connected between the transmit ports of the transmit receiver device and the transmit line and the differential amplifier outputs are isolated from the receive ports of the transmit receive device when the first switch means is turned on and the second switch means is not turned on, and the said third control signal controls said third switching means to connect the receive ports to the receive lines, and the differential amplifier outputs are connected to the receive ports of the transmit receiver device and the differential amplifier outputs are isolated from the transmit line when the second switch means is turned on and the first switch means is not turned on, and the said third control signal controls said third switching means to disconnect the receive ports from the receive line.

2. A line interface circuit according to claim 1, characterized in that said differential amplifier includes at least two transistors connected together to the same current source.

3. A line interface circuit according to claim 2, characterized in that each of said load circuits include resistors connected in series to diodes.

4. A line interface circuit according to claim 3, characterized in that said transistors in said differential amplifier are NPN devices.

* * * * *